Oct. 27, 1931.  W. B. THIEMAN  1,829,169

END GATE FOR WAGON BOXES

Filed Feb. 11, 1929

Inventor.
W. B. Thieman
by Omig & Hager Attys.

Patented Oct. 27, 1931

1,829,169

UNITED STATES PATENT OFFICE

WILLIAM B. THIEMAN, OF ALBERT CITY, IOWA

END GATE FOR WAGON BOXES

Application filed February 11, 1929. Serial No. 339,185.

The object of my invention is to provide an end gate of simple, durable and inexpensive construction, which may be easily and quickly applied to a wagon box, and when so applied will be rigidly supported therein, and which is constructed with upper and lower end gate members so that the lower end gate may be elevated to permit grain to be delivered from the wagon box as the box is elevated to a dumping position.

A further object is to provide in an end gate having upper and lower gate members, improved means for slidably mounting one of the gate members relative to the other.

A further object is to provide in an end gate having upper and lower gate members, one of which is slidably mounted relative to the other, improved means for actuating the slidably mounted gate.

A further object is to provide in an end gate improved means for easily and quickly mounting the same in a wagon box.

My invention consists in the construction, arrangement and combination of the various parts of the device, whereby the objects contemplated are attained, as hereinafter more fully set forth, pointed out in my claim, and illustrated in the accompanying drawings, in which:

Figure 1:
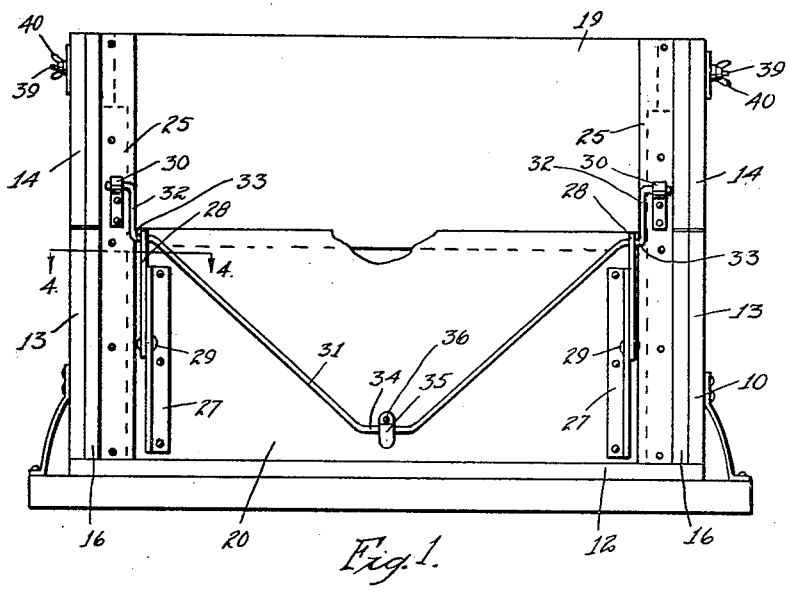
Figure 1 is an end elevation of my improved end gate showing the manner in which it is applied to a wagon box.
Figure 2:
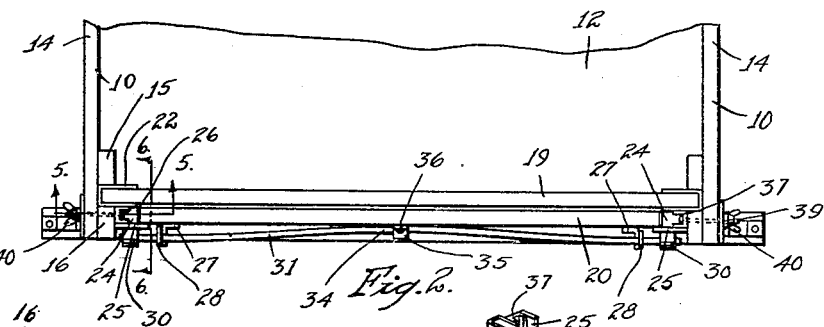
Figure 2 is a plan view of the same.

In the drawings I have used the numeral 10 to indicate a wagon box of the ordinary construction now in common use, having a bottom 12 and side members 13. Side boards 14 are supported on the upper edge of the members 13 and constitute the upper box. The side members 13 and 14 are provided with vertically arranged cleats 15 and 16 spaced apart a slight distance to form a groove 17.

Said grooves 17 are for the purpose of receiving the end gates. The side members 14 are provided with openings 18 which extend through the upper cleats 16 and support the end gate rods. These rods, however, are omitted when my improved end gate is applied.

My improved end gate comprises an upper gate 19 and a lower gate 20. The lower edge of each end of the gate 19 is provided with a downwardly extending strip 21 of a length equal to the height of the side members 13. The strips 21 and the ends of the gate 19 are designed to enter the grooves 17 when the gates are in position.

Figure 3:
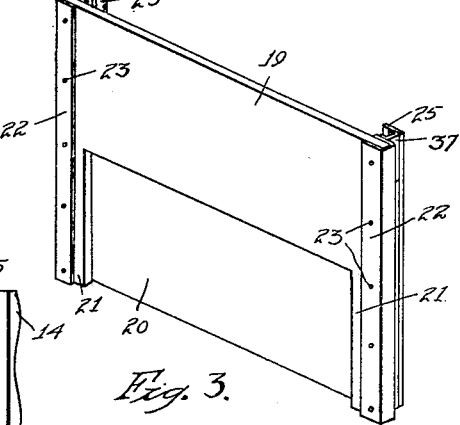
Figure 3 is a perspective view of the inner side of the end gate.
Figure 4:
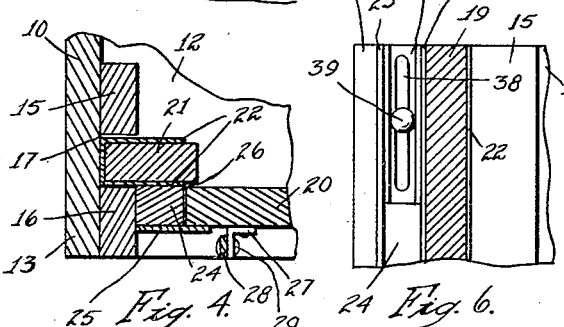
Figure 4 is a detail sectional view taken on the line 4—4 of Figure 1.
Figure 6:
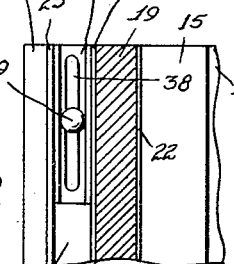
Figure 6 is a detail sectional view taken on the line 6—6 of Figure 2.

The ends of the gate 19 and the outer edges of the strips 21 are each provided with a reinforcing plate 22 designed to cover a portion of the back and front faces of the strips 21, and also the outer edges of said strips and the gate member 19, as clearly illustrated in Figures 3 and 4. These plates 22 are secured in position by suitable nails or rivets 23.

Secured to the back face of each of the plates 22 is a cleat 24. The said cleats 24 are designed to be supported adjacent to the cleats 16 when the end gate is in position in the box. The back of each of the cleats 24 is provided with a plate 25 having its inner edge projected inwardly from the inner edge of the cleat 25 so that grooves 26 are provided for receiving the gate 20, so that the said gate 20 may be elevated to a position opposite the back face of the gate 19 when so desired, or it may be lowered to cover the opening between the strips 21 and the lower edge of the gate 19.

The back face of the gate 20 is provided with upright angles 27 which reinforce the gate 20 against warping, and also act as hinge members for upwardly extending links 28. Said links 28 are secured to the members 27 by suitable pivots 29.

The back face of each of the plates 25 is provided with a bearing member 30, said bearing members being designed to receive the ends of an operating bail 31. The said bail is provided with downwardly extending portions 32 which terminate in horizontal portions 33 for receiving the upper ends of the links 28. The inner ends of the horizontal portions are bent downwardly and inwardly and terminate in a horizontal portion 34 designed to rest against the back face of the gate 20, when the said gate is in a closed position, and secured adjacent to said gate by means of a suitable button 35 having its upper end connected to the gate by means of a pivot 36. Said button is so arranged that it may be rotated through an angle of 180° which will release the horizontal portion 34. Said horizontal portion may then be swung rearwardly and upwardly, which in turn will cause the horizontal portions 33 to be elevated and with them the links 28 and the gate 20. The bail 31 acts as a lever for actuating the gate, which may be elevated any desired distance from the bottom 12, and provides a suitable opening through which grain may be delivered when the box is placed in an inclined position by the ordinary wagon dump.

The end gate is secured in the wagon box by means of upright channels 37 which are mounted above the upper ends of the cleats 24 and between the plates 25 and 22.

Figure 5:
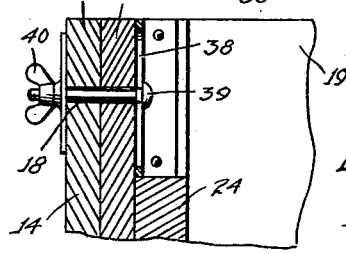
Figure 5 is a detail sectional view taken on the line 5—5 of Figure 2.

The outer face of each of the channels 37 is provided with a slot 38 for receiving a bolt 39. Said bolts are designed to enter the end gate rod openings 18 in the manner clearly illustrated in Figure 5. The outer ends of the bolts are provided with suitable thumb nuts 40. The slots 38 provide means whereby the end gate may be easily and quickly attached to wagon beds of various makes. The distance between the holes 18 and the top of the wagon box of the various makes of wagons is somewhat varied. Thus by providing the said slots 18 the bolts 39 may be elevated or lowered to accommodate openings of various heights.

Thus it will be seen that I have provided an end gate of simple and rigid construction, having a stationary and upper gate member which may be rigidly secured in the upper box by means of the bolts 39 which tie the rear end of the box together to prevent spreading, and provided in connection therewith a lower gate adapted to be easily elevated and lowered to provide a suitable outlet opening for the wagon box.

One of the advantages of my device lies in the reinforcing plates 22 which surround the outer edges of the upper gate 19, and the strips 21 to prevent excessive wear between the end of said members and the cleats 16 and 15. The plates 22 also reinforce the strips 21 which are made of lumber having the grain running horizontally or crossways of the strips. The said plates 22 prevent the strips 21 from cracking and breaking in sections.

The slotted channels 37 and the bolts 39 provide means for quickly attaching my improved end gate, while the angles 27 perform the double function of a hinge for the lower gate and reinforcing the said gate against warping, so that it will slide readily in the grooves 26.

I claim as my invention:

An end gate, comprising an upper gate member having the outer ends of its lower edge provided with downwardly extending strips, a cleat secured to the outer face of each end of said upper gate member and to the outer face of said downwardly extending strips, the upper end of said cleat terminating some distance below the upper edge of said upper gate member, a plate secured to the outer face of each of said cleats and projecting beyond the inner edge of said cleats to form a groove between each of said strips and said plate, a lower gate member slidably mounted in said grooves, means for elevating and lowering said lower gate member, means for detachably mounting said gate in a wagon box, the last said means comprising an upright channel mounted between each plate and said upper gate member and adjacent to the upper end of each of said cleats, the web of said channel being provided with a vertical slot, a bolt at each of said slots, and a thumb nut for each of said bolts.

WILLIAM B. THIEMAN.